(12) United States Patent
Christianson

(10) Patent No.: US 9,347,774 B2
(45) Date of Patent: May 24, 2016

(54) ANGULAR INDICATOR TOOL

(71) Applicant: Milwaukee Electric Tool Corporation, Brookfield, WI (US)

(72) Inventor: John Christianson, Waukesha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 116 days.

(21) Appl. No.: 14/176,745

(22) Filed: Feb. 10, 2014

(65) Prior Publication Data

US 2015/0075017 A1 Mar. 19, 2015

Related U.S. Application Data

(63) Continuation-in-part of application No. 29/467,125, filed on Sep. 16, 2013, now Pat. No. Des. 723,954.

(51) Int. Cl.
*G01C 9/28* (2006.01)
*G01C 9/34* (2006.01)

(52) U.S. Cl.
CPC ... *G01C 9/28* (2013.01); *G01C 9/34* (2013.01)

(58) Field of Classification Search
CPC .............. G01C 9/18; G01C 9/26; G01C 9/32; G01C 9/28; G01C 9/34
USPC .............. 33/371, 365, 367, 381, 529, 366.12, 33/366.15, 382
See application file for complete search history.

(56) References Cited

U.S. PATENT DOCUMENTS

| 555,771 | A | | 3/1896 | Hohnbaum |
| 657,443 | A | | 9/1900 | Newton |
| 1,422,231 | A | | 7/1922 | Stanley |
| 1,892,622 | A | | 12/1932 | Mayes |
| 2,419,941 | A | | 5/1947 | Belzung |
| 2,506,115 | A | * | 5/1950 | Stahlin ........................... 33/388 |
| 2,635,350 | A | | 4/1953 | Bettega |
| 2,816,369 | A | | 12/1957 | Becker |
| 3,435,533 | A | | 4/1969 | Whitfield |
| 3,513,558 | A | | 5/1970 | Kutchta et al. |

(Continued)

FOREIGN PATENT DOCUMENTS

| CN | 2648404 Y | 10/2004 |
| EP | 1122512 A1 | 8/2001 |

(Continued)

OTHER PUBLICATIONS

Klein Tools. Levels Innovative Leveling Solutions brochure. Date: Copyright 2012. 4 pages.

*Primary Examiner* — Christopher Fulton
(74) *Attorney, Agent, or Firm* — Michael Best & Friedrich LLP

(57) ABSTRACT

An improvement in workpiece-engageable devices for accurate workpiece angular formation including a plurality of spirit vials and an engager of a workpiece which establishes an intended bending plane. The plurality of spirit vials includes formation-angle vials adjacent to one another and supported in a respective plane parallel to the intended bending plane and in an orientation corresponding to a respective one of intended angles with respect to a base plane. At least one control vial is supported in a body of the device and aligned in a plane parallel to the base plane. The formation-angle vials may include four formation-angle vials each oriented at one of angles 10°, 22.5°, 30°, 45°, 90° and in some embodiments 60° with respect to the base plane.

26 Claims, 11 Drawing Sheets

(56) References Cited

U.S. PATENT DOCUMENTS

| | | | |
|---|---|---|---|
| 3,816,864 A * | 6/1974 | Cotter | 7/164 |
| 3,832,782 A * | 9/1974 | Johnson et al. | 33/451 |
| 4,274,208 A | 6/1981 | Yakkel | |
| 4,338,725 A | 7/1982 | Martin et al. | |
| 4,394,799 A * | 7/1983 | Moree et al. | 33/343 |
| 4,590,682 A * | 5/1986 | Koch | 33/383 |
| 4,947,556 A | 8/1990 | Peil | |
| 5,058,407 A | 10/1991 | Parker | |
| 5,839,200 A | 11/1998 | Decesare | |
| 6,550,156 B1 * | 4/2003 | Scoville | 33/809 |
| 7,117,606 B2 | 10/2006 | Brown | |
| 7,305,773 B2 | 12/2007 | Hios et al. | |
| 7,536,798 B2 | 5/2009 | Silberberg | |
| D595,165 S * | 6/2009 | Silberberg | D10/69 |
| 8,061,051 B2 | 11/2011 | Allemand | |
| 8,281,496 B1 | 10/2012 | Mies | |
| 2008/0250662 A1 * | 10/2008 | Allemand | 33/379 |
| 2008/0271331 A1 * | 11/2008 | Allemand | 33/371 |
| 2009/0313839 A1 | 12/2009 | Spaulding et al. | |
| 2012/0151785 A1 | 6/2012 | Lettkeman et al. | |

FOREIGN PATENT DOCUMENTS

| | | |
|---|---|---|
| JP | 08219779 A | 8/1996 |
| JP | 2004226390 A | 8/2004 |
| JP | 2005049266 A | 2/2005 |
| WO | 2012074225 A1 | 6/2012 |

* cited by examiner

ANGULAR INDICATOR TOOL

RELATED APPLICATION

This application is a continuation-in-part of U.S. application Ser. No. 29/467,125, filed Sep. 16, 2013, the contents of which are incorporated herein by reference.

FIELD OF THE INVENTION

This invention relates to the field of electrical conduit installation and, more particularly, to tools for accurate angular formation during bending of electrical conduits.

BACKGROUND OF THE INVENTION

In many conduit applications, local building codes require that wires, particularly electrical wires, be enclosed in pipes or conduit, primarily for safety reasons. Conduit is typically made of a metal such as aluminum or steel and is sold commercially in straight pieces of various lengths.

In the course of installing conduit in or along a wall, it is necessary to bend the conduit to avoid doorways, ducts and other obstructions. An electrician can bend small-diameter, thinwall conduit by hand. Bending heavier conduits requires special bending tools and sometimes bending machines, including mechanical, hydraulic and electrically-powered machines.

A common conduit bending task is to form an "offset," i.e., a pair of equal and opposite bends in a length of conduit such that the end portions of the conduit are parallel to, but offset from, each other. For example, where a conduit is to be installed horizontally in a wall, but a vent obstructs its path, an offset would be formed in the conduit so that, when installed, it passes by—either above or below—the obstruction, and resumes a horizontal orientation. Another conduit bending task is to form a "saddle." A saddle consists of a first offset, a complementary offset, equal and opposite to the first offset. The saddle thus includes four bends, arranged such that a U-shaped detour is formed in the conduit to circumvent an obstruction.

It is critical that offsets and saddles be formed such that the entire length of the bent conduit lies in a plane so that, upon installation, the conduit fits inside or flush against the wall. If any bend after the first bend is made improperly, a section of the conduit will extend outside the plane. Such an errant section of pipe is known as a "wow" or "dogleg." In other words, very accurate conduit bending is highly desired, and achieving accuracy in the bending of conduit can be challenging.

Conduit bending may be done on elaborate and expensive "bending tables." Simpler bending machines also may be used, but all bending machines require "leveling" the conduit in the bending machine to form an offset or a saddle. "Leveling" means rotationally positioning the pipe relative to a reference plane, for example a horizontal plane, prior to forming each bend.

One method of leveling a conduit is sometimes called "eyeballing." As the name implies, the operator simply uses his naked eyesight to view the bend after it is made to determine if a level position has been achieved. The method requires the operator to "eyeball" the bend from various angles and therefore is time consuming. Accuracy depends solely upon the skill of the operator and can be extremely poor if the operator's skills are low. Material loss and labor expense using this method can be very high.

Another known leveling method requires assembling a pair of locking pliers (for example, Vise-Grips), a length of square channel ("Kindorf") stock, and a magnetic torpedo-type level. The operator applies the locking pliers to attach the channel stock to an open end of the conduit pipe to be bent. The magnetic torpedo level is then (magnetically) attached to the channel stock. The operator views the torpedo level to aid him or her in leveling the conduit relative to a horizontal plane.

The foregoing method is time consuming and unreliable. The orientation of the three detachable parts is critical, so that if any of them is bumped while bending the conduit, a dogleg is likely to result. The locking pliers are not a stable attachment means because the plier jaws do not fittingly engage the inside contour of the pipe to be bent. An inaccurate bend can result if the pliers shift during the bending process.

Another problem with this makeshift level is that the bubble level indicator in the torpedo level is not clearly visible from the position from which the operator makes the bends. The operator must move around the bending machine and the pipe being bent to adjust the bending direction. These added footsteps increase the time required for bending.

Certain prior tools for use in conduit bending only provide level vials facilitating so-called "no-dog" bending. The accuracy of the intended bending angle other than 90° is often determined by the operator's viewing of angle-registration marks on the head of a conduit-bending tool such as one seen in FIG. 18. Such method, can be very inaccurate and is heavily dependent on the operator's experience. In certain situations when several conduits need to be bent to a particular angle and remain parallel to each other, as seen in FIG. 17, a higher accuracy is desired.

Previously, the operators using a torpedo level have encountered difficulties related to visibility of the torpedo-level vials, as well as the need for observing a plurality of separate instruments. Accordingly, it too requires the operator frequently to move about in order to check for level positioning of the conduit preparatory to bending. This often results in inaccuracy and lost time.

It is desired to have an improved easy-to-use instrumentation for no-dog conduit bending and accurate indication of the intended bending angle with improved visibility of conduit-position indicators while facilitating time-efficient performance of conduit bending.

SUMMARY OF THE INVENTION

This invention, which will be described in detail below, is an improvement in workpiece-engageable devices for accurate workpiece angular formation including a plurality of spirit vials and an engager of a workpiece. In the improved device of the present invention, the workpiece engager establishes an intended bending plane and the plurality of spirit vials includes formation-angle vials adjacent to one another. Each vial is supported in a respective plane parallel to the intended bending plane and in an orientation corresponding to a respective one of intended angles with respect to a base plane (hereafter described).

In certain embodiments, the inventive device has a body which defines the base plane and has an opposite surface. At least one control vial is supported in the body between the base plane and the opposite surface and aligned in a plane parallel to the base plane. The opposite surface defines at least one control-viewing window for the at least one control vial such that the at least one control vial serves to indicate when the workpiece is in an initial 0° orientation.

The at least one control vial may include two control vials positioned orthogonally to each other to facilitate the accuracy of the initial orientation of the workpiece. In some of such embodiments, the opposite surface defines two control-viewing windows, each for one of the control vials.

In certain embodiments, the opposite surface includes a control-vial portion and a formation-angle vial portion. The control-vial portion includes the control-viewing window(s). The formation-angle vial portion includes at least one formation-angle viewing window for the plurality of formation-angle vials.

In some of such embodiments, the at least one formation-angle viewing window includes a plurality of formation-angle viewing windows adjacent to one another, each formation-angle viewing window being for one of the formation-angle vials. The formation-angle vial portion of the opposite surface may include a plurality of regions angled with respect to one another. Each region may include one of the formation-angle viewing windows. In some versions, each region of the formation-angle vial portion is oriented with respect to the base plane at an angle corresponding to a respective one of the intended angles with respect to the base plane.

In certain embodiments, the intended angles include 10°, 22.5°, 30° and 45°. In such embodiments, the formation-angle vials may include four formation-angle vials each oriented at one of such angles with respect to the base plane. In some embodiments, the formation-angle vials further include a vial oriented at 60° with respect to the base plane.

The regions with the corresponding spirit vials may be arranged in ascending order for workpiece bending in one direction.

Certain embodiments of the improved device may further include a 90° formation-angle vial positioned orthogonally with respect to the base plane. Such device may also have a transverse surface including a viewing window for the 90° formation-angle vial.

In some versions, the transverse surface spans between the base plane and the formation-angle vial portion of the opposite surface. The transverse surface may be substantially orthogonal with respect to the base plane. In some of these versions, the 10° and 90° formation-angle vials are in a common plane. The other formation-angle vials may each be in a plane parallel to the common plane.

In certain embodiments, the base plane is defined by at least portions of a base surface. The workpiece engager may include at least one magnet disposed along the base surface. In some of such embodiments, the base surface includes a groove recessed from the base plane and forming a pair of workpiece-engaging surfaces. At least one magnet may be disposed at each of the workpiece-engaging surfaces.

In some embodiments, the workpiece engager includes a clamping mechanism secured with respect to the body for fixed engagement of the workpiece to the body. The clamping mechanism may include a pair of protrusions extending from the body and a fastening member supported by one of the protrusions. The pair of protrusions define a space therebetween for receiving a portion of the workpiece. The fastening member is movable toward the other of the protrusion for securing the workpiece to the device.

In some versions of the device of the present invention, the formation-angle vial portion may be at one end of the body and the clamping mechanism is at the opposite end of the body.

DETAILED DESCRIPTION OF PREFERRED EMBODIMENTS

Figure 1:
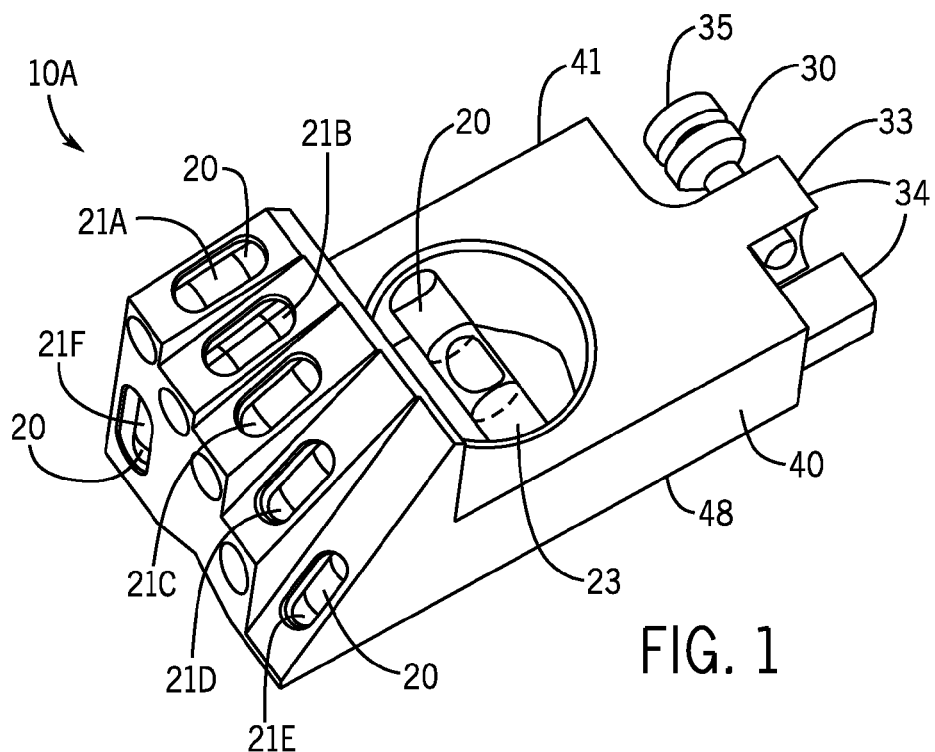
FIG. 1 is perspective view from a viewing side of a first embodiment of an angular indicator tool according to the present invention.

FIGS. 1-16 illustrate four alternative embodiments of an inventive workpiece-engageable device 10A, 10B, 10C and 10D for accurate workpiece angular formation. Hereinafter the inventive device 10 is also called an angular indicator tool. The inventive device 10 includes a plurality of spirit vials 20 and an engager 30 for engagement with workpiece 100. FIG. 17 shows an exemplary workpiece as an electrical conduit 100 which is one of a grouping of conduits parallel to one another and each bent to the same particular angle.

Figure 19:
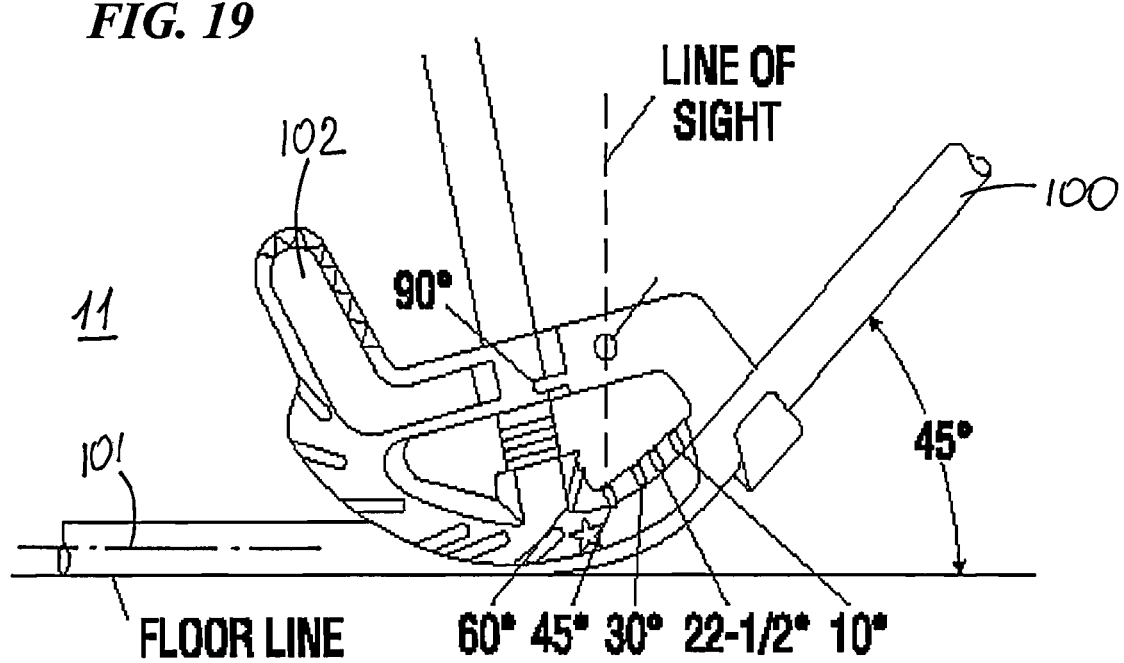
FIG. 19 is a schematic illustration of use of the conduit-bending tool of the type shown in FIG. 18 with the conduit being positioned on a horizontal surface.
Figure 20:
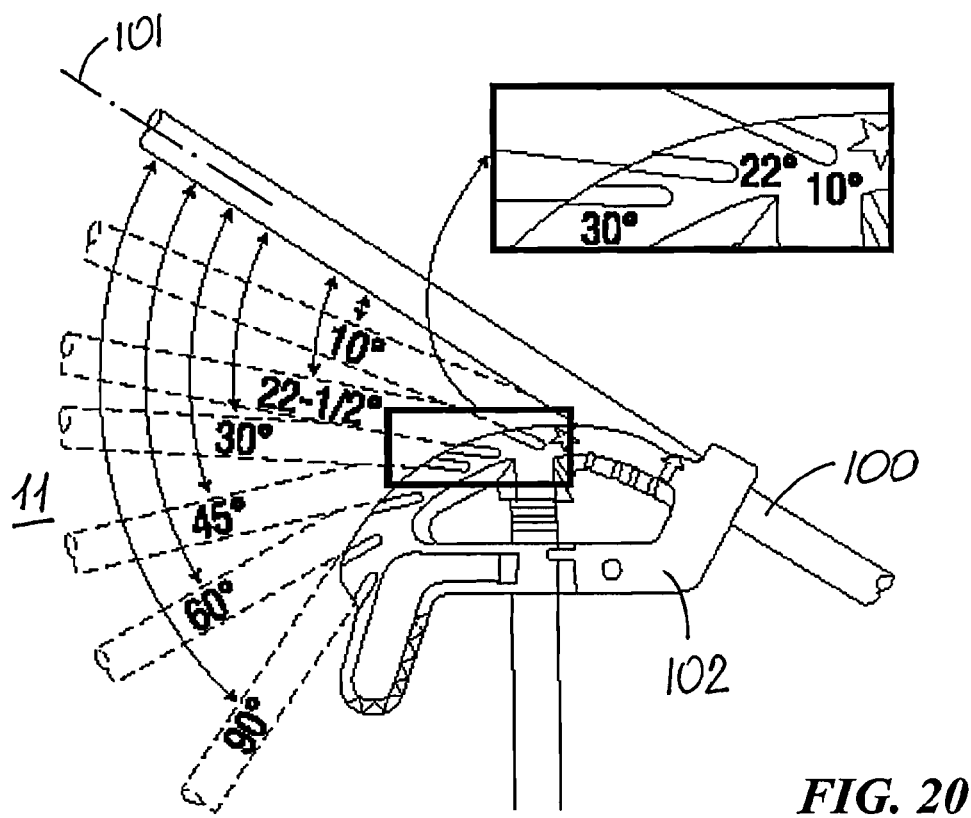
FIG. 20 is a schematic illustration of use of the conduit-bending tool of FIG. 19 for bending a suspended conduit for angular formation along an intended bending plane.
Figure 21:
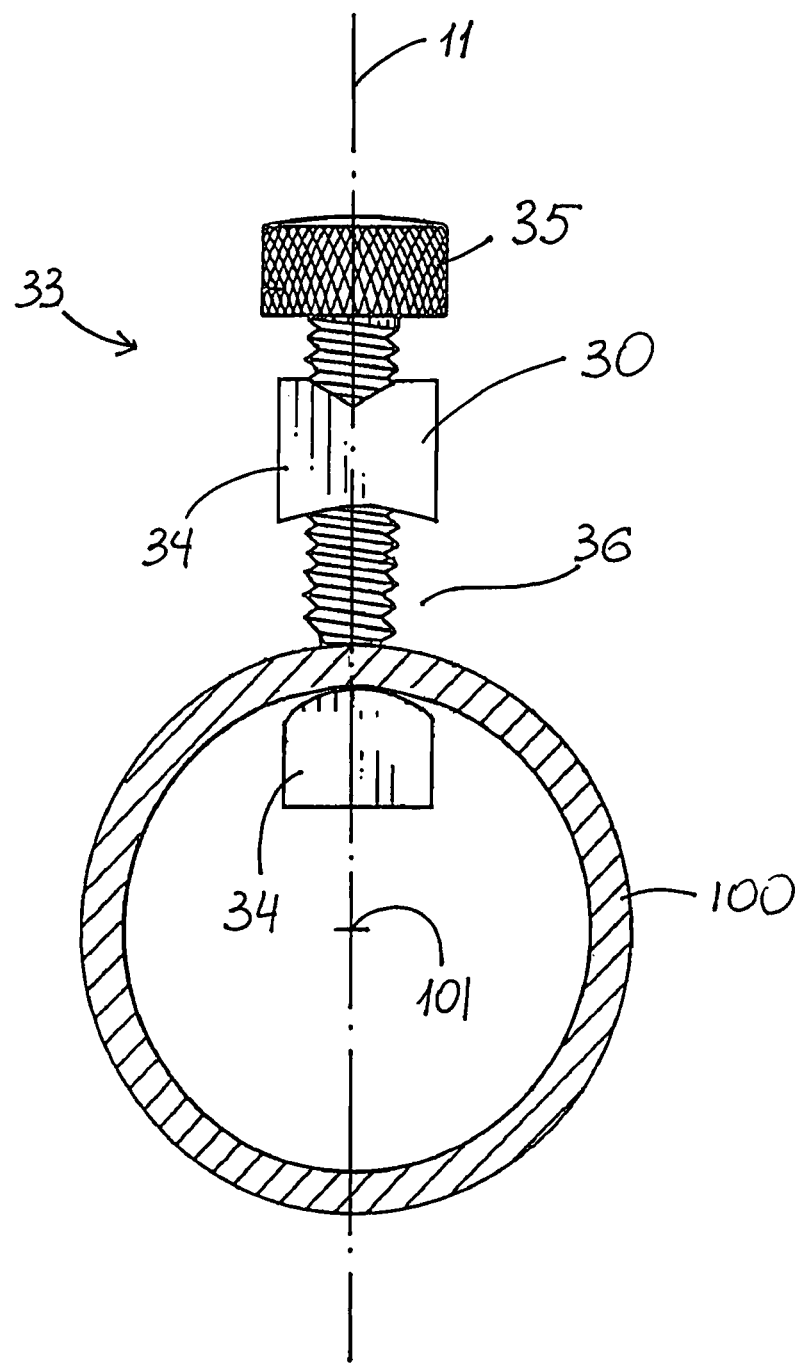
FIG. 21 is a cross-sectional view of the conduit secured to the angular indicator tool which is partially illustrated by showing only the clamping mechanism of the engager.

Workpiece engager 30 establishes an intended bending plane 11. FIGS. 19-21 schematically illustrate that bending plane is parallel to the plane including an initial axis 101 of conduit 100.

Figure 11:
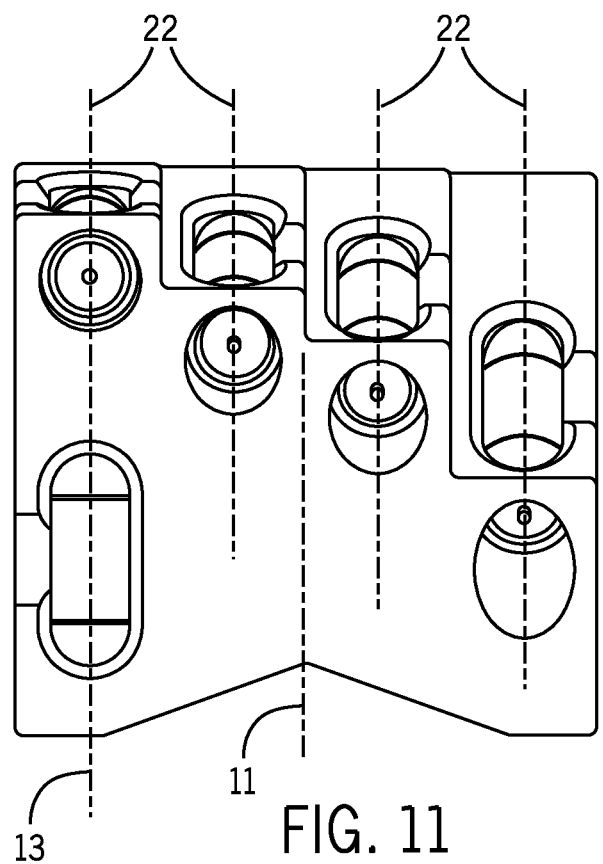
FIG. 11 is an elevation from the 90°-vial transverse surface of the angular indicator tool of FIG. 7.
Figure 12:
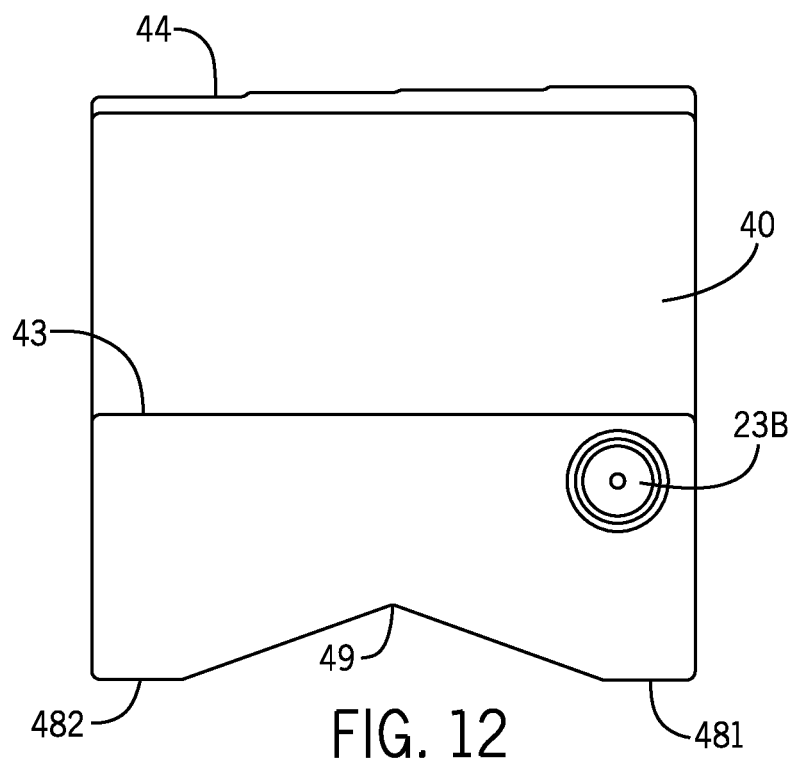
FIG. 12 is an elevation from the 0°-vial transverse surface of the angular indicator tool of FIG. 7.
Figure 13:
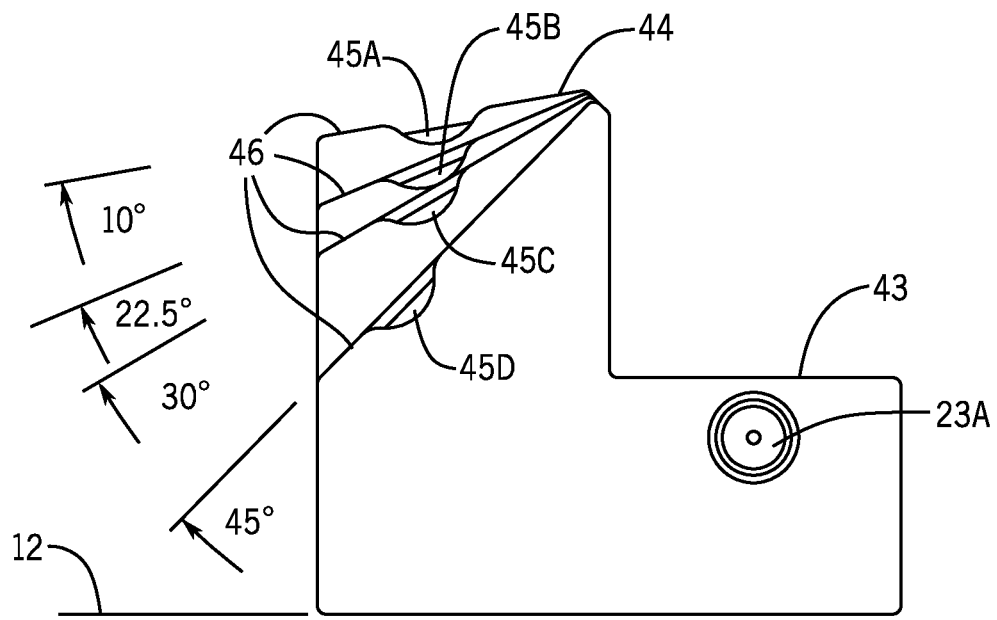
FIG. 13 is an elevation from the transverse surface at the 45° vial of the angular indicator tool of FIG. 7.
Figure 14:
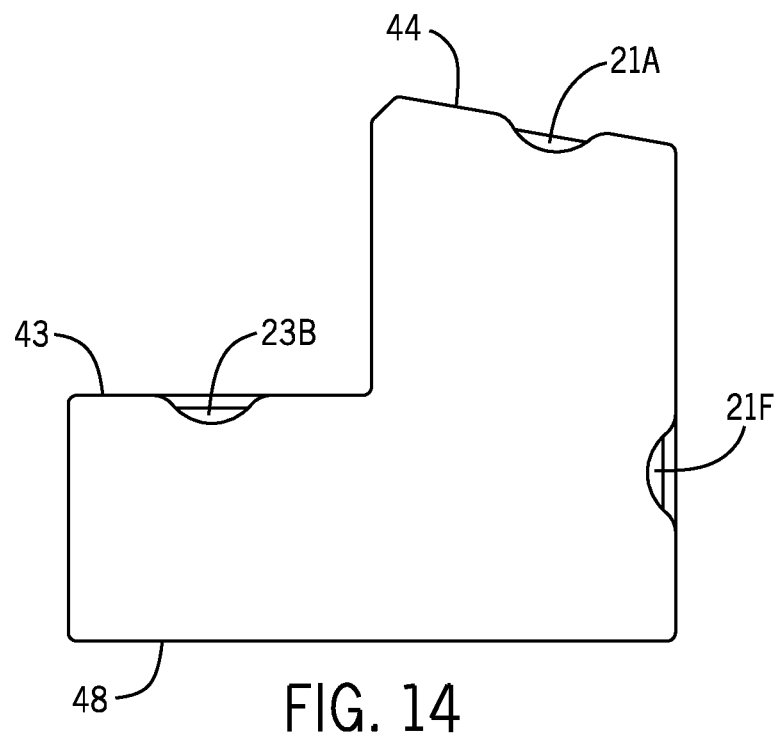
FIG. 14 is an elevation from the transverse surface at the 10° vial of the angular indicator tool of FIG. 7.

In illustrated embodiments of angular indicator tool 10, the plurality of spirit vials 20 include formation-angle vials 21 adjacent to one another, as shown in FIG. 11. Each formation-angle vial 21 is supported in a respective plane 22 parallel to intended bending plane 11 and in an angular orientation corresponding to a respective one of intended angles with respect to a base plane 12, as best seen in FIG. 13.

Device 10 has a body 40 which defines base plane 12 and has an opposite surface 41. As best seen in FIGS. 1, 3, 5-7 and 9, a control vial 23 is supported in body 40 between base plane 12 and opposite surface 41 and aligned in a control-vial plane parallel to base plane 12. Opposite surface 41 defines a control-viewing window 42 for control vial 23 such that control vial 23 serves to indicate when the workpiece 100 is in an initial 0° orientation.

Figure 7:
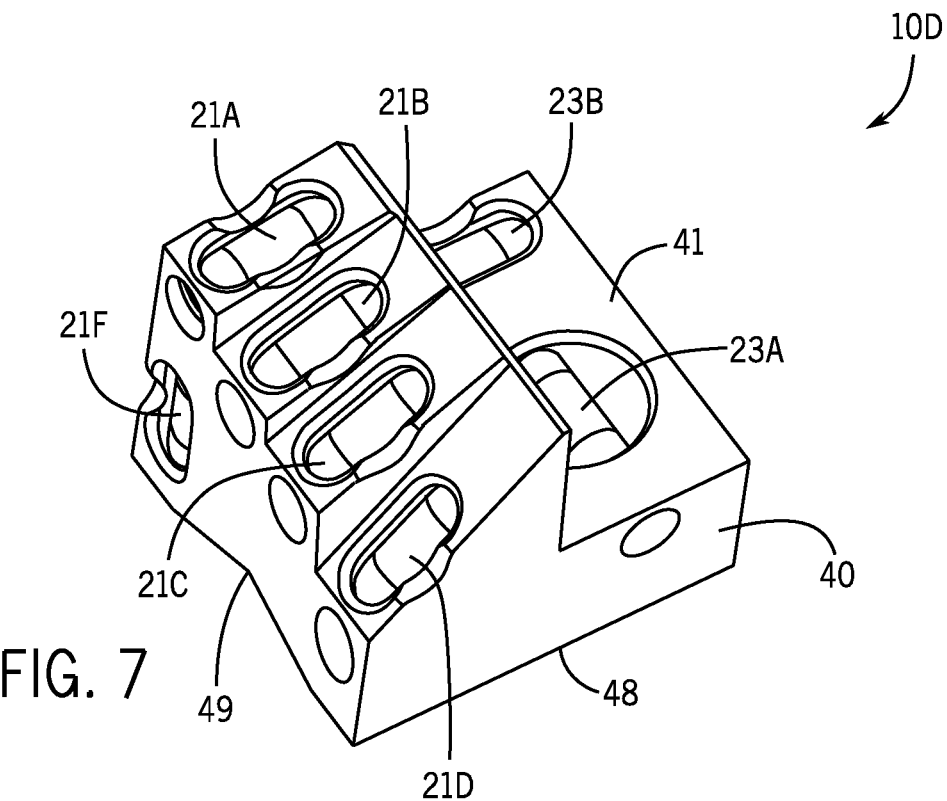
FIG. 7 is a perspective view from a viewing side of a fourth embodiment of an angular indicator tool according to the present invention, showing a transverse surface at the 45° vial.
Figures 9, 10:
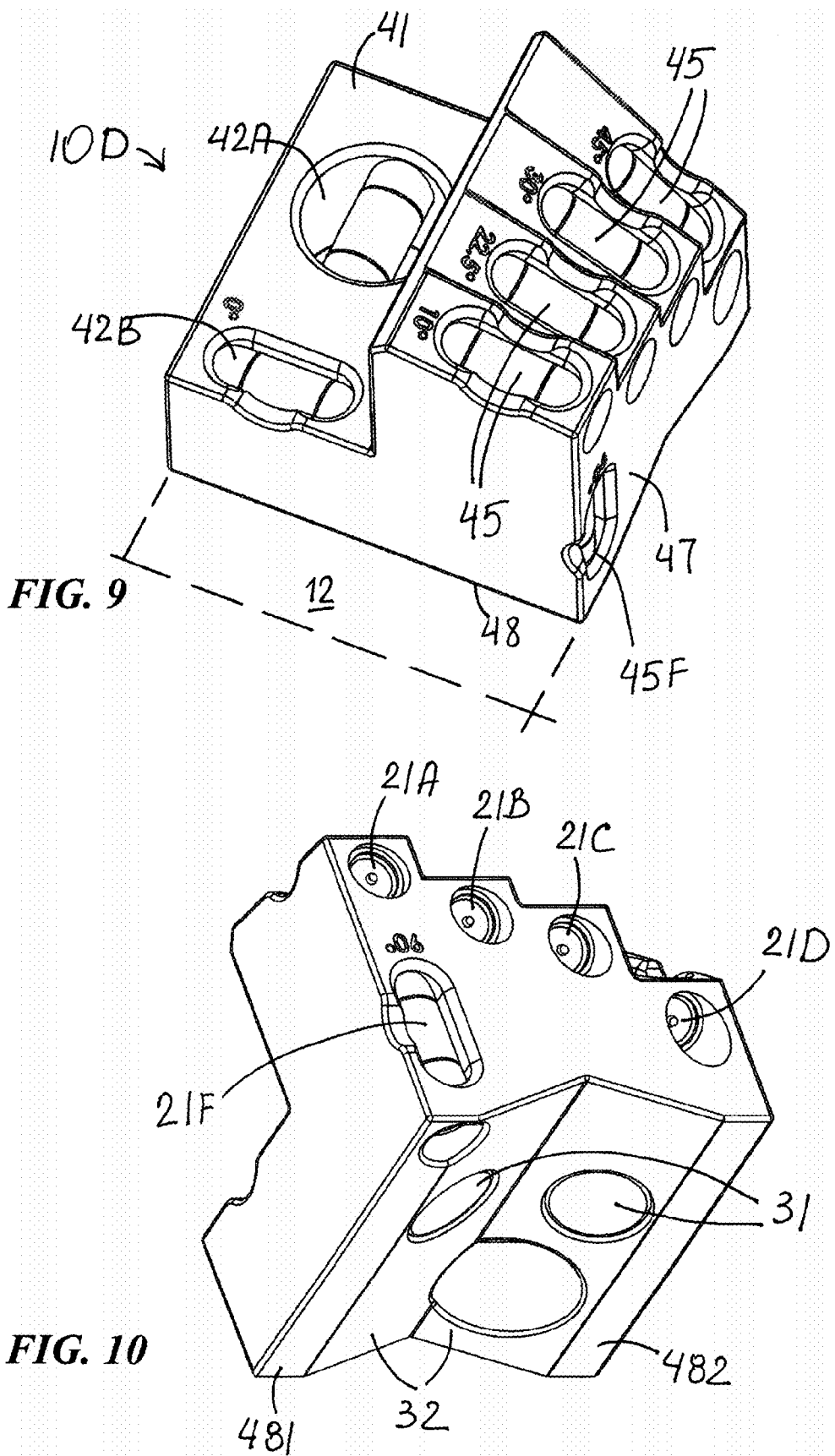
FIG. 9 is another perspective view from the viewing side of the angular indicator tool of FIG. 7, showing an opposite transverse surface at the 10° vial.
FIG. 10 is another perspective view from the base plane of the angular indicator tool of FIG. 7, showing an opposite transverse surface at the 10° vial.
Figure 15:
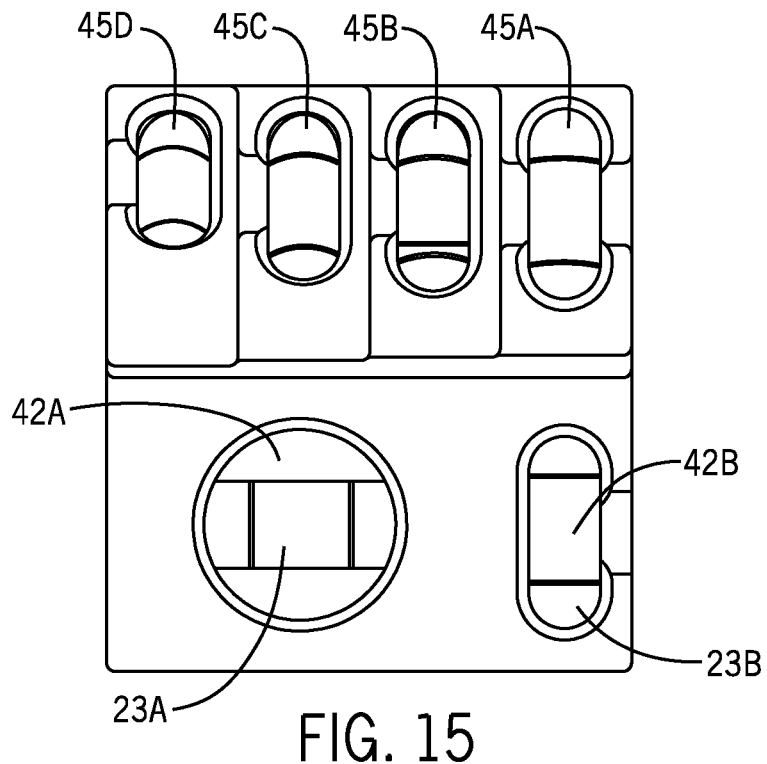
FIG. 15 is a viewing-side plan view of the angular indicator tool of FIG. 7.

FIGS. 7, 9 and 15 show the fourth embodiment of tool 10D which includes two control vials 23A and 23B positioned orthogonally to each other to facilitate the accuracy of the initial orientation of workpiece 100. It is best seen in FIG. 9 that opposite surface 41 defines two control-viewing windows 42A and 42B, each for one of control vials 23A and 23B.

Certain alternative embodiments of the present invention may have a common control-viewing window for both control vials.

Figure 5:
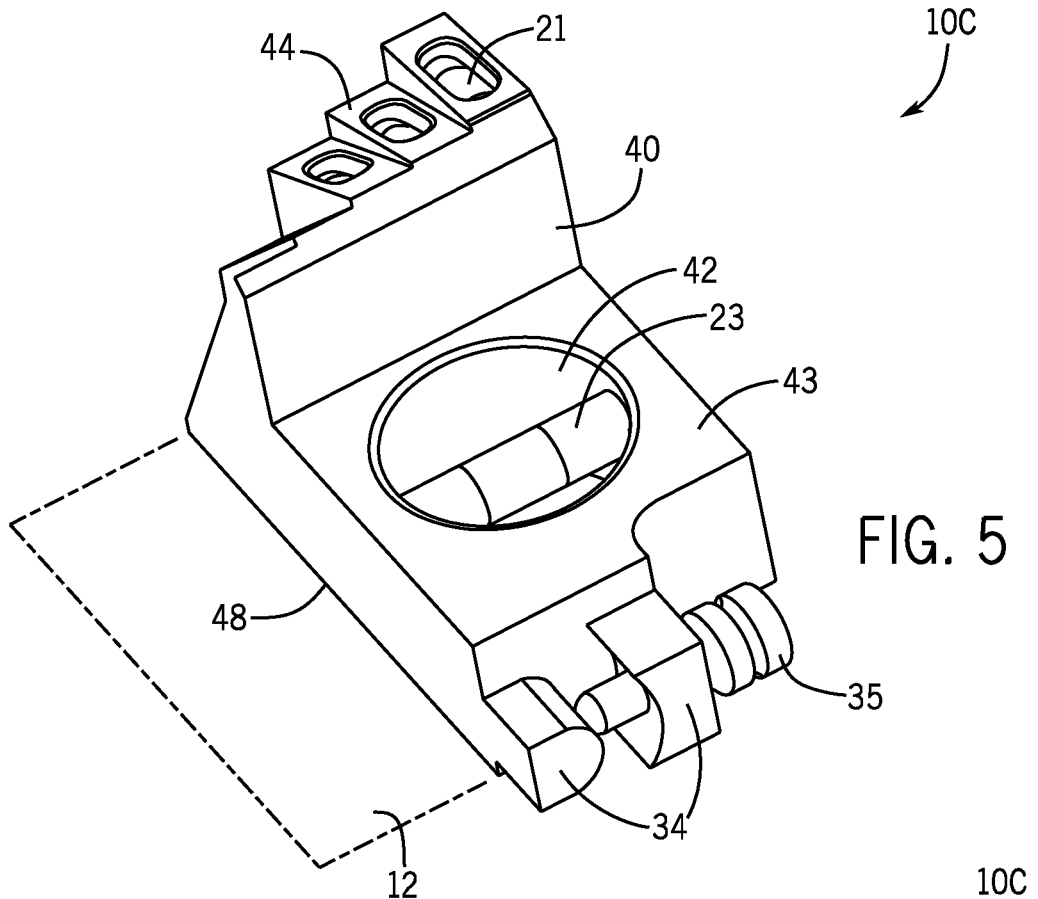
FIG. 5 is a perspective view from a viewing side of a third embodiment of an angular indicator tool according to the present invention.
Figure 6:
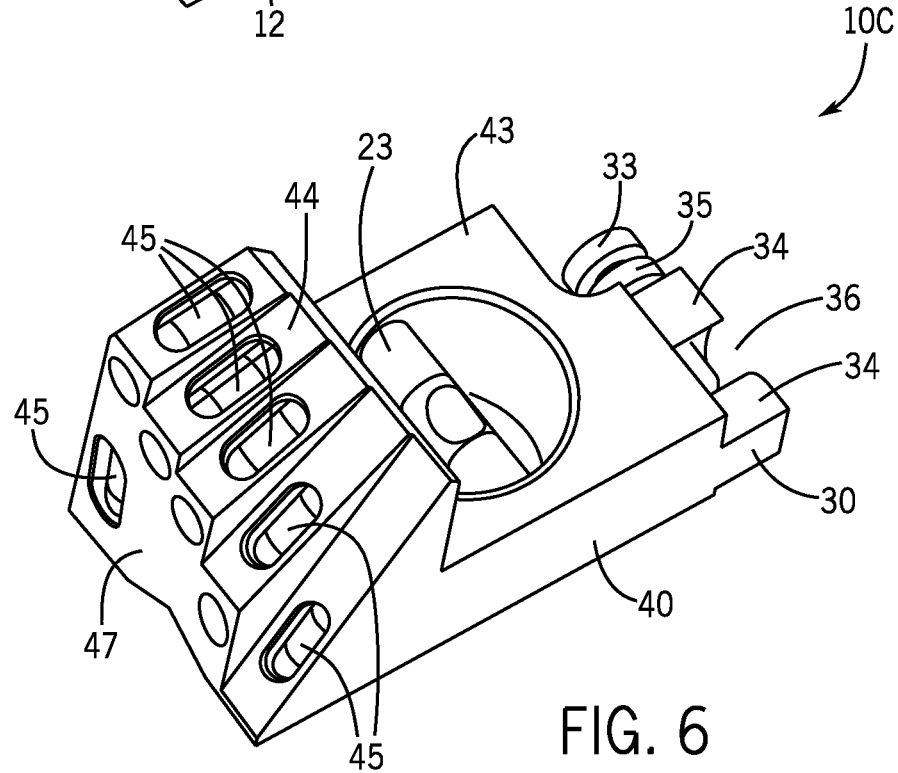
FIG. 6 is a perspective view from a base plane of the angular indicator tool of FIG. 5.

Opposite surface 41 includes a control-vial portion 43 and a formation-angle vial portion 44, seen in FIGS. 5 and 6. Control-vial portion 43 includes control-viewing window 42. In fourth embodiments of inventive tool 1 OD, control-vial portion 43 includes two control-viewing windows 42A and 42B.

Figure 4:
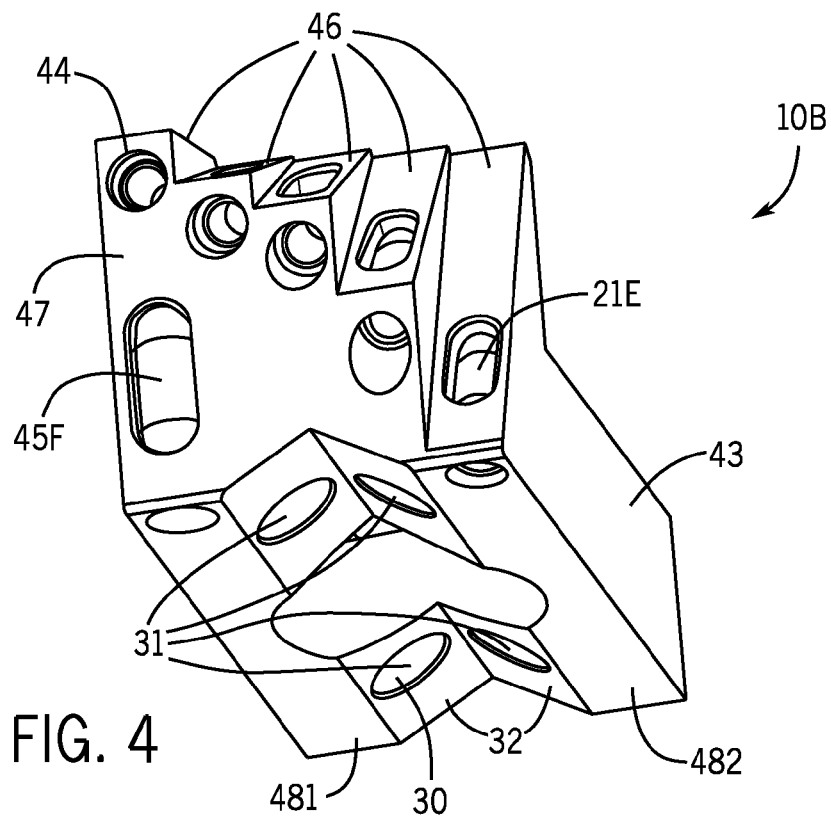
FIG. 4 is a perspective view from a base plane of the angular indicator tool of FIG. 3.

In illustrated embodiments of inventive tool 10, formation-angle vial portion 44 includes a plurality of formation-angle viewing windows 45 adjacent to one another, each formation-angle viewing window being for one of the formation-angle vials 21, seen in FIGS. 6 and 13. Formation-angle vial portion 44 of opposite surface 41 includes a plurality of regions 46 angled with respect to one another, as seen in FIG. 4. Each region 46 includes one of formation-angle viewing windows 45. FIG. 13 best shows that each region 46 of formation-angle vial portion 44 being oriented with respect to base plane 12 at an angle corresponding to a respective one of the intended angles with respect to base plane 12.

In some alternative embodiments, formation-angle vial portion may have a single common window for all of the adjacent formation-angle vials. Such common window may be substantially planar and sloping over all of the formation-angle vials. Alternatively, the common window may have a Fresnel-like surface with each facet corresponding to one of the adjacent formation-angle vials.

In illustrated embodiments, tool 10 includes formation-angle vial 21A oriented at intended angle 10° with respect to base plane 12, formation-angle vial 21B oriented at intended angle 22.5°, formation-angle vial 21C oriented at intended angle 30° and formation-angle vial 21D oriented at intended angle 45°, as shown in FIG. 7. FIGS. 1-6 show that first, second and third embodiments of inventive tool 10A, 10B and 10D include a formation-angle vial 21E oriented at intended angle 60° with respect to base plane 12, as indicated in FIG. 4.

In the illustrated embodiments, regions 46 with corresponding vials 21 are arranged adjacent to one another in order of decrease/increase of their corresponding angle with respect to base plane 12. Regions 46 are also so oriented that all formation-angle viewing windows 45 are facing in common direction.

In certain alternative embodiments, the angled regions may be oriented such that the formation-angle viewing windows are facing in different directions. An alternative orientation of the angled region may be such that adjacent formation-angle viewing windows are facing in opposite directions.

The illustrated embodiments of tool 10 further include a 90° formation-angle vial 21F positioned orthogonally with respect to base plane 12. Tool 10 also has a transverse surface 47 including a viewing window 45F for the 90° formation-angle vial 21F. Transverse surface 47 is shown spanning between base plane 12 and formation-angle vial portion 44 of opposite surface 41. Transverse surface 47 is substantially orthogonal with respect to base plane 12. 10° formation-angle vial 21A and 90° formation-angle vial 21F are shown to be positioned in a common plane 13, as best seen in FIG. 11. Formation-angle vials 21B, 21C, 21D and 21E are each in a corresponding one of vial planes 22 parallel to common plane 13.

Figure 18:
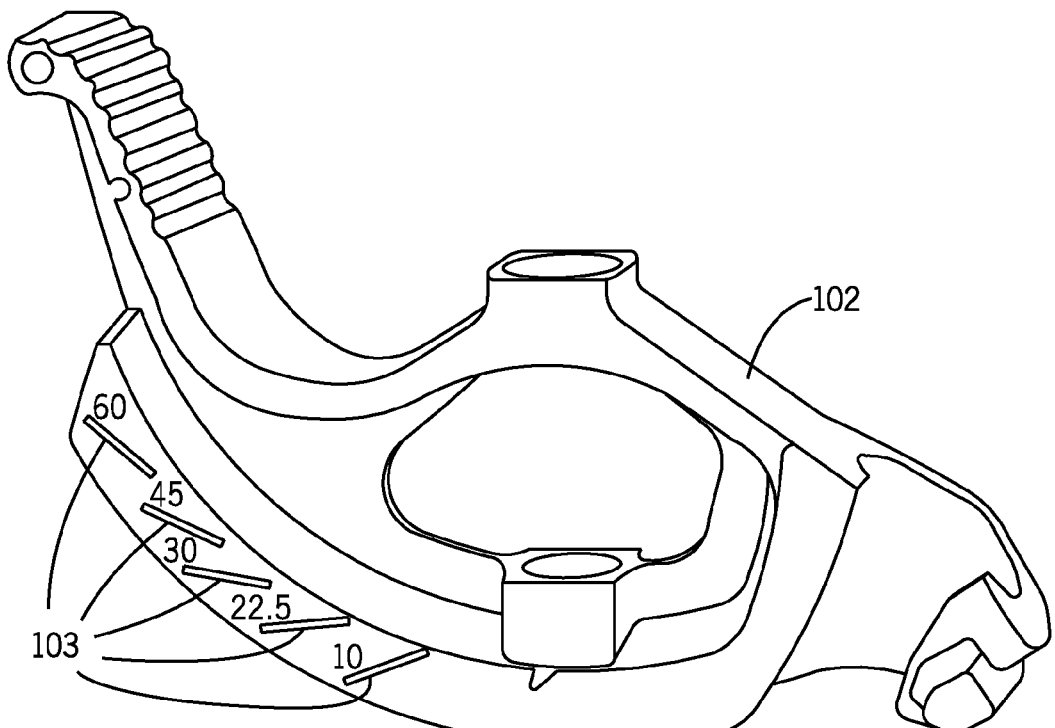
FIG. 18 is a perspective view of an example of a conduit-bending tool.

As seen in FIGS. 18-20, the angles 10°, 22.5°, 30°, 45°, 60° and 90° of formation-angle vials 21 correspond to marking 103 on conduit-bending tool 102.

In tool 10C of the third embodiment shown in FIGS. 5 and 6, base plane 12 is defined by a base surface 48. In tools 10A, 10B and 10D of the first, second and fourth embodiments shown in FIGS. 2, 4 and 8-12, base plane 12 is defined by portions 481 and 482 of base surface 48.

Figure 2:
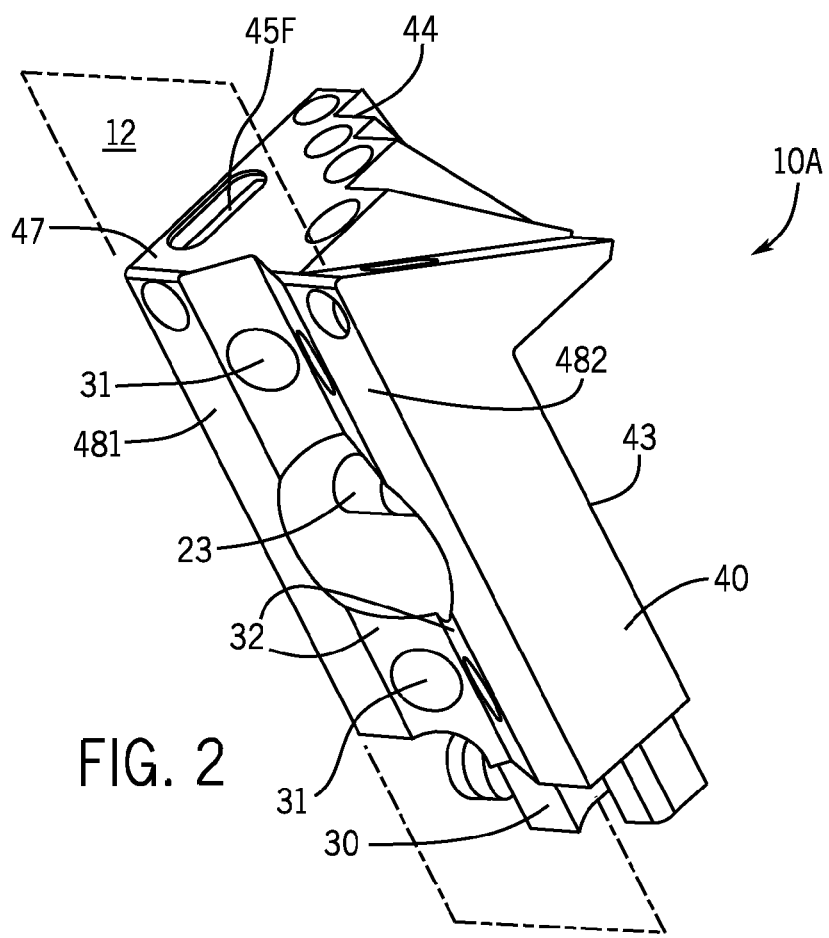
FIG. 2 is a perspective view from a base plane of the angular indicator tool of FIG. 1.
Figure 3:
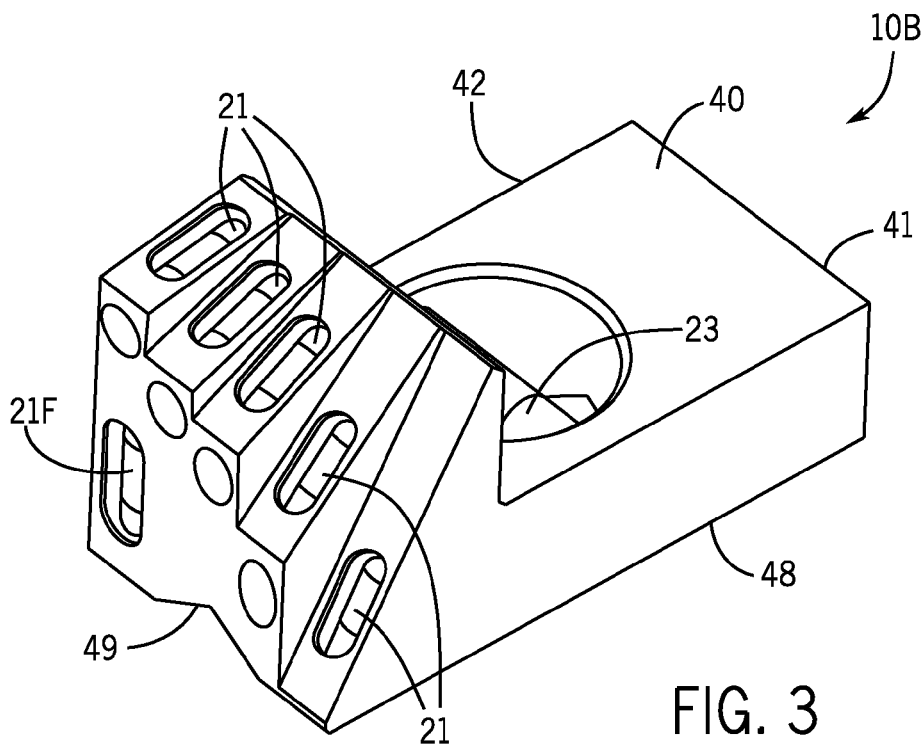
FIG. 3 is a perspective view from a viewing side of a second embodiment of an angular indicator tool according to the present invention.
Figure 8:
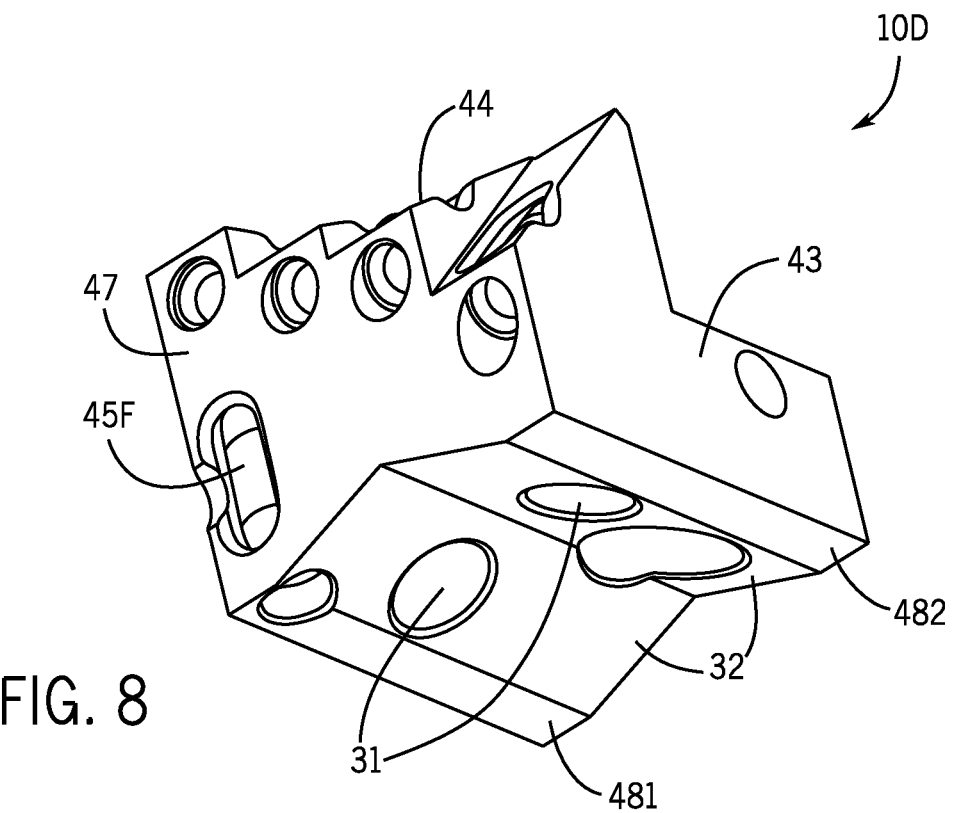
FIG. 8 is a perspective view from a base plane of the angular indicator tool of FIG. 7.
Figure 16:
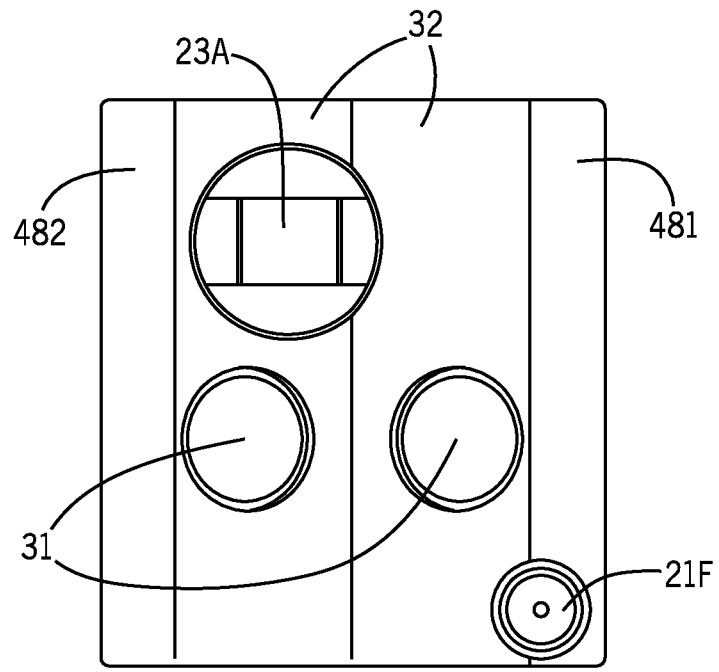
FIG. 16 is a base-plane plan view of the angular indicator tool of FIG. 7.
Figure 17:
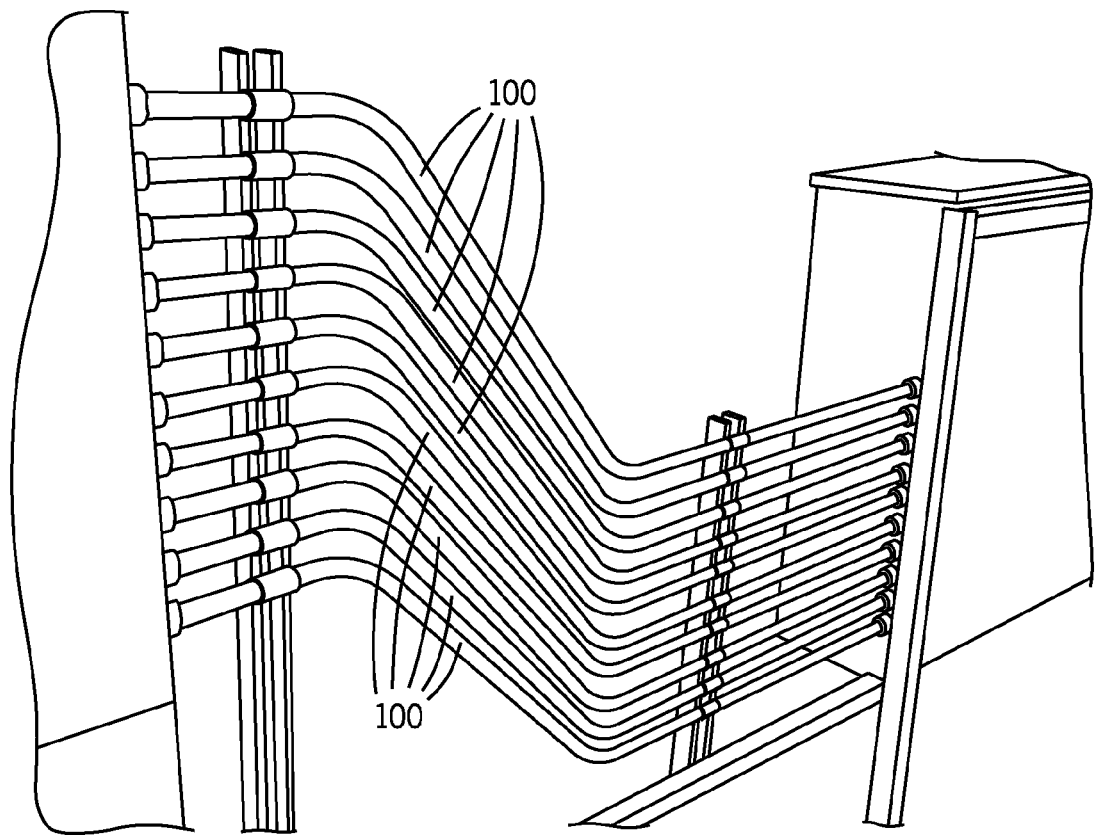
FIG. 17 is a perspective view illustrating a grouping of several conduits bent parallel to each other.

FIGS. 2, 4, 8, 10 and 16 show workpiece engager 30 including magnets 31 disposed along base surface 48. In tools 10A, 10B and 10D of the first, second and fourth embodiments, base surface 48 includes a groove 49 recessed from base plane 12 and forming a pair of workpiece-engaging surfaces 32. FIGS. 8, 10 and 16 show one of magnets 31 being disposed at a corresponding one of workpiece-engaging surfaces 32. FIGS. 2 and 4 show that in the first and second embodiments, there is a pair of magnets 31 being disposed at a corresponding one of workpiece-engaging surfaces 32.

In the first and third embodiments of tool 10A and 10C seen in FIGS. 1, 2, 5 and 6, workpiece engager 30 includes a clamping mechanism 33 secured with respect to body 40 for fixed engagement of workpiece 100 to body 40. Clamping mechanism 33 includes a pair of protrusions 34 extending from body 40 and a fastening member 35 supported by one of protrusions 34. The pair of protrusions 34 define a space 36 therebetween for receiving a portion of workpiece 100, as seen in FIG. 21. Fastening member 35 is movable toward the other of protrusion 34 for securing workpiece 100 to device 10. The illustrated embodiments of the device of the present invention are configured such that formation-angle vial portion 44 is at one end of body 40 and clamping mechanism 33 is at the opposite end of body 40.

While the principles of the invention have been shown and described in connection with specific embodiments, it is to be understood that such embodiments are by way of example and are not limiting.

The invention claimed is:

1. In a workpiece-engageable device for accurate workpiece angular formation including a plurality of spirit vials and an engager of a workpiece, the improvement comprising:
the workpiece engager establishing an intended bending plane; and
the plurality of spirit vials includes formation-angle vials adjacent to one another, each formation-angle vial being supported in a respective plane parallel to the intended bending plane and in an orientation corresponding to a respective one of intended angles;

wherein each formation-angle vial defines a longitudinal axis, and no longitudinal axis intersects any other longitudinal axis.

2. The device of claim 1 comprising:
a body defining a base plane and having an opposite surface; and
at least one control vial supported in the body between the base plane and the opposite surface and aligned in a plane parallel to the base plane, the opposite surface defining at least one control-viewing window for the at least one control vial,
whereby the at least one control vial serves to indicate when the workpiece is in an initial 0° orientation.

3. The device of claim 2 wherein the at least one control vial includes two control vials positioned orthogonally to each other to facilitate the accuracy of the initial orientation of the workpiece.

4. The device of claim 2 wherein the opposite surface includes:
a control-vial portion including the control-viewing window(s); and
a formation-angle vial portion including at least one formation-angle viewing window for the plurality of formation-angle vials.

5. The device of claim 4 wherein the opposite surface defines two control-viewing windows each for one of the control vials.

6. The device of claim 5 wherein the workpiece engager includes a clamping mechanism secured with respect to the body for fixed engagement of the workpiece to the body.

7. The device of claim 6 wherein the clamping mechanism includes:
a pair of protrusions extending from the body and defining a space therebetween for receiving a portion of the workpiece; and
a fastening member supported by one of the protrusions and movable toward the other for securing the workpiece to the device.

8. The device of claim 7 wherein:
the formation-angle vial portion is at one end of the body; and
the clamping mechanism is at the opposite end of the body.

9. The device of claim 8 wherein:
the base plane is defined by at least portions of a base surface; and
the workpiece engager includes at least one magnet disposed along the base surface.

10. The device of claim 9 wherein:
the base surface includes a groove recessed from the base plane and forming a pair of workpiece-engaging surfaces: and
at least one magnet disposed at each of the workpiece-engaging surfaces.

11. The device of claim 4 wherein the at least one formation-angle viewing window includes a plurality of formation-angle viewing windows adjacent to one another, each formation-angle viewing window being for one of the formation-angle vials.

12. The device of claim 11 wherein the formation-angle vial portion of the opposite surface includes a plurality of regions angled with respect to one another, each region including one of the formation-angle viewing windows.

13. The device of claim 12 wherein each region of the formation-angle vial portion is oriented with respect to the base plane at an angle corresponding to a respective one of the intended angles.

14. The device of claim 13 wherein:
the intended angles include 10°, 22.5°, 30° and 45° with respect to the base plane;
the formation-angle vials include four formation-angle vials each oriented at one of such angles; and
the regions with the corresponding spirit vials are arranged in ascending order for workpiece bending in one direction.

15. The device of claim 14 wherein the at least one control vial includes two control vials positioned orthogonally to each other to facilitate the accuracy of the initial orientation of the workpiece.

16. The device of claim 15 wherein the opposite surface defines two control-viewing windows each for one of the control vials.

17. The device of claim 15 further including:
a 90° formation-angle vial positioned orthogonally with respect to the base plane; and
a transverse surface including a viewing window for the 90° formation-angle vial.

18. The device of claim 17 wherein the formation-angle vials further include a vial positioned at 60°.

19. The device of claim 14 further including:
a 90° formation-angle vial positioned orthogonally with respect to the base plane; and
a transverse surface including a viewing window for the 90° formation-angle vial.

20. The device of claim 19 wherein the transverse surface spanning between the base plane and the formation-angle vial portion of the opposite surface, the transverse surface being substantially orthogonal with respect to the base plane.

21. The device of claim 20 wherein the 10° and 90° formation-angle vials are in a common plane.

22. The device of claim 21 wherein the other formation-angle vials are each in a plane parallel to the common plane.

23. The device of claim 4 wherein:
the base surface is defined by at least portions of a base surface; and
the workpiece engager includes at least one magnet disposed along the base surface.

24. The device of claim 23 wherein:
the base surface includes a groove recessed from the base plane and forming a pair of workpiece-engaging surfaces; and
at least one magnet disposed at each of the workpiece-engaging surfaces.

25. A level comprising:
a body including a base;
an engager configured to move along a first axis to couple the level to a workpiece;
a first vial extending from a first end to a second end along a second axis, the second axis being parallel to the first axis; and
a second vial extending from a first end to a second end along a third axis, the third axis being non-parallel to the first and second axes and forming a first angle with the base;
wherein the first angle is non-zero and the second axis does not intersect the third axis.

26. The device of claim 25, further comprising third, fourth, and fifth vials each extending from a first end to a second end along fourth, fifth, and sixth axes respectively, the fourth axis forming a second angle with the base, the fifth axis forming a third angle with the base, the sixth axis forming a fourth angle with the base, wherein the first, second, third, and fourth angles are all different.

* * * * *